US012575513B2

(12) United States Patent
Knipp et al.

(10) Patent No.: US 12,575,513 B2
(45) **Date of Patent: \*Mar. 17, 2026**

(54) STUMP GRINDER WITH GRINDING ARM AND CONTROL

(71) Applicant: The Toro Company, Bloomington, MN (US)

(72) Inventors: Joseph C. Knipp, Elko, MN (US); Christopher J. Kost, North Mankato, MN (US); David A. Murray, Eagan, MN (US); Landon M. Aldinger, Iowa Falls, IA (US); John P. Azure, Bloomington, MN (US)

(73) Assignee: The Toro Company, Bloomington, MN (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/289,591

(22) Filed: Aug. 4, 2025

(65) Prior Publication Data

US 2025/0359521 A1 Nov. 27, 2025

Related U.S. Application Data

(60) Continuation of application No. 18/320,822, filed on May 19, 2023, now Pat. No. 12,376,534, which is a continuation of application No. 17/407,650, filed on Aug. 20, 2021, now Pat. No. 11,672,210, which is a continuation of application No. 16/406,661, filed on May 8, 2019, now Pat. No. 11,109,542, which is a continuation of application No. 14/847,477, filed on Sep. 8, 2015, now Pat. No. 10,292,341, which is a division of application No. 12/987,797, filed on Jan. 10, 2011, now Pat. No. 9,462,759.

(51) Int. Cl.
*A01G 23/06* (2006.01)

(52) U.S. Cl.
CPC ........... *A01G 23/067* (2013.01); *A01G 23/06* (2013.01)

(58) Field of Classification Search
CPC ...................................................... A01G 23/06
See application file for complete search history.

(56) References Cited

U.S. PATENT DOCUMENTS

| | | | |
|---|---|---|---|
| 3,336,958 A | 8/1967 | Carlton | |
| 3,870,161 A | 3/1975 | Cording | |

(Continued)

FOREIGN PATENT DOCUMENTS

| | | |
|---|---|---|
| AU | 685909 | 1/1998 |
| AU | 6850909 | 1/1998 |
| DE | 10127125 | 12/2002 |

OTHER PUBLICATIONS

Barreto, "Models 1324 & 1624 & 1824 Hydraulic Trenchers", Operating Safety Instructions, Aug. 28, 2007.

(Continued)

*Primary Examiner* — Matthew Katcoff
(74) *Attorney, Agent, or Firm* — Merchant & Gould P.C.

(57) ABSTRACT

A stump grinder has a grinding arm that durably mounts a rotatable grinding wheel. The stump grinder includes a motor with a drive shaft that is rotatably coupled to the grinding wheel. The grinding wheel includes a stub shaft attached thereto that is received within a bearing. A control is movable to produce corresponding pivoting motion of the grinding arm. The control includes a depressible trigger for starting and stopping the operation of the grinding wheel.

30 Claims, 7 Drawing Sheets

(56) References Cited

U.S. PATENT DOCUMENTS

| | | | |
|---|---|---|---|
| 4,036,321 | A | 7/1977 | Habiger |
| 4,041,996 | A | 8/1977 | Grover |
| 4,223,593 | A | 9/1980 | Kitayama |
| 4,271,879 | A | 6/1981 | Shivers, Jr. et al. |
| 5,158,126 | A | 10/1992 | Lang |
| 5,289,859 | A | 3/1994 | Minton, Jr. et al. |
| 5,566,586 | A | 10/1996 | Lauer et al. |
| 5,638,619 | A | 6/1997 | Bowling |
| 5,794,673 | A | 8/1998 | Milbourn |
| 5,957,213 | A | 9/1999 | Loraas et al. |
| 6,026,871 | A | 2/2000 | Chapman |
| 6,047,749 | A | 4/2000 | Lamb |
| 6,305,445 | B1 | 10/2001 | Falatok et al. |
| 6,343,237 | B1 | 1/2002 | Rossow et al. |
| 6,431,231 | B1 | 8/2002 | Braaten et al. |
| 6,435,234 | B1 | 8/2002 | Paumier |
| 6,438,874 | B1 | 8/2002 | LaBounty et al. |
| 6,499,238 | B2 | 12/2002 | Kluck et al. |
| 6,709,223 | B2 | 3/2004 | Walto et al. |
| 7,011,124 | B1 | 3/2006 | Morey |
| 7,032,333 | B2 | 4/2006 | Friberg et al. |
| 7,334,658 | B2 | 2/2008 | Berg et al. |
| 7,398,805 | B2 | 7/2008 | Dubbs et al. |
| 7,401,542 | B2 | 7/2008 | Stephens et al. |
| 7,431,059 | B2 | 10/2008 | Cochran |
| 8,109,303 | B1 | 2/2012 | Holmes |
| 8,783,308 | B2 | 7/2014 | Kappel et al. |
| 9,462,759 | B2 | 10/2016 | Knipp et al. |
| 10,117,388 | B2 | 11/2018 | Azure |
| 10,292,341 | B2 | 5/2019 | Knipp et al. |
| 10,729,293 | B2 | 8/2020 | Crichton et al. |
| 10,993,389 | B2 | 5/2021 | Azure |
| 11,109,542 | B2 | 9/2021 | Knipp et al. |
| 11,672,210 | B2 | 6/2023 | Knipp et al. |
| 2002/0195869 | A1 | 12/2002 | Dybsetter |
| 2005/0036876 | A1 | 2/2005 | Walto et al. |
| 2006/0255193 | A1 | 11/2006 | Hockstra et al. |
| 2007/0051427 | A1 | 3/2007 | Wise |
| 2012/0175018 | A1 | 7/2012 | Knipp et al. |

OTHER PUBLICATIONS

Barreto, "Models 1324 & 1624 & 1824 Hydraulic Trenchers", Operators Manual, Jun. 4, 2008.

Barreto, "Hydraulic Rear Tine Tiller", Brochure, Date unknown, but believed to be available to the public at least as early as Jan. 10, 2011.

Barreto, "Tine Shaft, Cover & Motor", Parts list, Oct. 7, 2004.

"Bandit Chippers, ""Bandit-model-2800_self-propellered""", Demostration of Bandit model 2800 function, Jul. 15, 2008https://www.youtube.com/watch?app=desktop&v=d_QbBTdBu9k (Year: 2008)".

"Bandit Chippers, ""Bandit-model-2100_self-propellered""", Demostration of Bandit model 2100 function, Jul. 15, 2008https://www.youtube.com/watch?v=ah4nFEWU5fA (Year: 2008)".

Bandit Chippers, Announcing Bandit's Model ZT-1844 Stump Grinder!, Aug. 2, 2017, https://www.youtube.com/watch?v+H536hqLOqUI&t=3s (Year: 2017).

Bobcat, "MT52 Mini Track Loader Specifications", Mar. 1, 2010.

"Bobcat, ""Bobcat Stump Grinder Attachment""", Demonstration of Stump grinder attachment in use, Oct. 5, 2011https://www.youtube.com/watch?v=esj_C2LtChY".

"Bobcat, ""Bobcat Stump Grinder Attachment on an MT85""", Demonstration of Stump grinder attachment in use, Dec. 10, 2020https://www.youtube.com/watch?v=YNR4FFZQWsA".

Chartier, Dean, Screen Shot Taken at 0:00 of "Rayco 1645 Grinding" YouTube video found at https://youtu.be/9ct3Xxzat48, dated May 3, 2017.

For Construction pros.com, Article Entitled "Vermeer Introduces Four New Products to the Rental Market," dated Feb. 27, 2013.

ForestryTrader.com, 2009 Vermeer SC652, https://www.forestrytrader.com/listing/for-sale/198787359/2009-vermeer-sc652-wheel-stump-grinders (Year: 2020).

Rayco Manufacturing, Inc., Rayco RG 1625A—RG 1635 Super JR Stump Cutters brocure, dated 2006.

Rayco Manufacturing, Inc., "RG1645 Stump Cutter Brochure", dated 2008.

Rayco Manufacturing, Inc., "Pages 7 and 8 from a Rayco Stum Cutter Brocure depictin gthe RG1625A, RG1635, and RG1645 Stump Cutters," first indexed by Google Jan. 2013.

Rayco Manufacturing, Inc., Rayco Stump Cutter Full Line brochure, dated 2007.

The Toro Company, "Stump Grinder for Compact Utility Loaders, Model No. 22429-210000001 and up," Operator's Manual, dated 2005.

The Toro Company, STX-26 Stump Grinder Operator's Manual, dated 2012.

Vermeer Corporation, SC40TX Stump Cutter Spec Sheet, dated 2015.

Vermeer Corporation, Vermeer Stump Cutter SC252 brochure, dated 2008.

Vermeer Corporation, Vermeer Stump Cutter SC90/SC130 brochure, dated 2003.

Vermeer Corporation, SC30TX Stump Cutter Spec Sheet, dated 2016.

The Toro Company Notification Regarding Related Litigation for U.S. Appl. No. 19/289,591, filed with the U.S. Patent and Trademark Office on Dec. 12, 2025; 2 pages.

Barreto Manufacturing, Inc. filed Complaint against the Toro Company for Declaratory Judgment with the United States District Court of Oregon Pendleton Division on Dec. 9, 2025; Case No. 25-cv-2285; 32 pages.

Sure Grip Controls Inc.; "S" Series Control Grip description and specifications, May 12, 2008, accessed via Wayback Machine, 1 page.

FIG. I

STUMP GRINDER WITH GRINDING ARM AND CONTROL

CROSS-REFERENCE TO RELATED APPLICATIONS

This application is a Continuation of U.S. application Ser. No. 18/320,822, filed May 19, 2023, now U.S. Pat. No. 12,376,534. U.S. application Ser. No. 18/320,822 is a Continuation of U.S. application Ser. No. 17/407,650, filed Aug. 20, 2021, now U.S. Pat. No. 11,672,210. U.S. application Ser. No. 17/407,650 is a Continuation of U.S. application Ser. No. 16/406,661, filed May 8, 2019, now U.S. Pat. No. 11,109,542. U.S. application Ser. No. 16/406,661 is a Continuation of U.S. application Ser. No. 14/847,477, filed Sep. 8, 2015, now U.S. Pat. No. 10,292,341. U.S. application Ser. No. 14/847,477 is a Division of U.S. application Ser. No. 12/987,797, filed Jan. 10, 2011, now U.S. Pat. No. 9,462, 759. The disclosure of each of the above applications is hereby incorporated by reference in its entirety.

TECHNICAL FIELD

This invention relates generally to the field of stump grinding in which a powered grinding wheel is used to grind or comminute a stump or other wood debris into a pile of wood chips or particles.

BACKGROUND OF THE INVENTION

Stump grinders are well known devices that employ a pivotal grinding arm that carries a rotatable grinding wheel at its outer end. The grinding wheel extends generally vertically and has powered rotation about a substantially horizontal axis of rotation. The pivotal grinding arm is pivotal on a support frame in an up and down motion about a substantially horizontal axis. In addition, the grinding arm is also pivotal in a side-to-side motion about a substantially vertical axis in many stump grinders.

When the grinding wheel is placed into operation and is rotating m a vertical plane about its substantially horizontal axis of rotation, the operator can pivot the grinding arm up and down and from side-to-side. This causes the grinding wheel to bite into and traverse over the stump or other wood debris that is to be grinded into particles. As repeated passes of the grinding arm and grinding wheel are made relative to the stump or other wood debris, the action of the grinding wheel gradually reduces the stump or wood debris to small wood chips or fine particles.

Stump grinders typically have the pivotal grinding arm and the grinding wheel arranged generally symmetrically with respect to the lateral width of the frame of the stump grinder. Thus, for an operator who is standing behind the frame or is carried on the frame on some type of seat or operator's platform, the grinding arm is usually disposed in a home position that is centered on the stump grinder frame and extends away from the operator in a straight fore-and-aft direction. The grinding arm traverses from side-to-side in generally equal arcs to either side of the home position. However, in this centered home position, the view of the operator with respect to the action of the grinding wheel on the stump or wood debris can be blocked or obstructed by the structure of the grinding arm itself. In other words, the operator may not be able to clearly see the contact area between the grinding wheel and the stump or wood debris.

In addition, the task of operating the stump grinder can involve multiple controls that can be difficult or at least confusing for the operator to use. There must be a set of traction and steering controls for the operator to use to control the forward and reverse motion of the stump grinder frame and to steer or turn the stump grinder frame. In addition, there must be other grinding arm controls to allow the operator to manipulate the grinding arm to cause the grinding arm to pivot up and down and to traverse from side-to-side out of the centered home position. There must also be an on-off grinding control to start or stop the rotation of the grinding wheel on the grinding arm.

Typically, the grinding arm controls often take the form of multiple levers. One lever controls the up and down motion of the grinding arm. Another lever controls the side-to-side traverse. The on-off grinding control often comprises yet another separate control, i.e. a separate on-off switch. Needless to say, it is not an easy task for the operator, particularly an unskilled operator who might rent a stump grinder from a rental business and is thus somewhat unfamiliar with the controls, to coordinate and properly use all of the multiple controls typically found on a stump grinder.

Finally, it should be apparent that the grinding wheel of a stump grinder should be reliably and durably driven in a cost-effective and simple manner. Mechanical drive systems, such as belt or chain drives, are prone to breaking given the forces involved in stump grinding and are costly and time consuming to maintain and to keep properly adjusted. Hydraulic motors carried on the grinding arm have been used to directly drive or rotate the grinding wheel without the interposition of belt or chain drives. However, the high forces involved in grinding that are transmitted to the shaft of such a hydraulic motor often exert large loads on the motor, leading to premature wear and failure of the motor. Given the relatively high cost of such hydraulic motors, this is a disadvantage of known designs in which hydraulic motors have been used to directly drive the grinding wheels.

SUMMARY OF THE INVENTION

One aspect of this invention relates to a stump grinder which comprises a frame that is supported for movement over the ground, the frame having a width between a left side and a right side thereof. A rotatable grinding wheel rotates about a substantially horizontal wheel axis for grinding or comminuting stumps or wood debris. A grinding arm comprises a rear section that is pivotally journalled to the frame for up and down pivoting about a substantially horizontal pivot axis, the rear section of the grinding arm being located substantially proximate to and along one side of the frame such that the rear section of the grinding arm is laterally offset relative to the frame. The grinding arm also has a front section that carries the rotatable grinding wheel. The front section is pivotally journalled to the rear section of the grinding arm for side-to-side pivoting about a substantially vertical pivot axis. The front section of the grinding arm has a position in which the front section of the grinding arm is longitudinally aligned in a fore-and-aft direction with the rear section of the grinding arm to be located with the rear section substantially proximate to and along the one side of the frame. The front section is pivotal about the vertical pivot axis out of the aligned position to traverse in a sideways direction across a substantial portion of the entire width of the frame with the rear section of the grinding arm remaining in place substantially proximate to and along the one side of the frame to allow the operator to better view, in a manner that is unobstructed by the rear section, the operation of the grinding wheel carried on the front section of the grinding arm.

Another aspect of this invention relates to a stump grinder which comprises a frame that is supported for movement over the ground. A rotatable grinding wheel rotates about a substantially horizontal wheel axis for grinding or comminuting stumps or wood debris. A grinding arm is movable relative to the frame with the grinding arm mounting the grinding wheel. The grinding arm has a pair of spaced side walls between which the grinding wheel is rotatably journalled. A motor is secured to one side wall of the grinding arm, the motor having a drive shaft that extends inwardly and that has a drive connection to the grinding wheel such that rotation of the drive shaft of the motor rotates the grinding wheel about the horizontal axis of rotation thereof. The motor has a pair of radial bearings for directly supporting the drive shaft of the motor and thus for indirectly supporting the grinding wheel from one side of the grinding wheel. A stub shaft is operatively secured to an opposite face of the grinding wheel. A third radial bearing is secured to an opposite side wall of the grinding arm for receiving the stub shaft, the stub shaft and third bearing additionally supporting the grinding wheel from an opposite side of the grinding wheel.

Yet another aspect of this invention relates to a stump grinder which comprises a frame that is supported for movement over the ground. A rotatable grinding wheel is provided that rotates about a substantially horizontal wheel axis for grinding or comminuting stumps or wood debris. A grinding arm is movable relative to the frame and mounts the grinding wheel. The grinding arm is pivotal about substantially horizontal and vertical axes to cause the grinding arm to pivot up and down about the horizontal axis and from side-to-side about the vertical axis. A single joystick controls the up and down and side-to-side pivoting of the grinding arm. The joystick is carried on the frame for manipulation by an operator along first and second orthogonal axes that are correlated to desired directions of pivoting of the grinding arm, the joystick being pulled rearwardly out of a neutral position in a fore-and-aft direction to lift the grinding arm, being pushed forwardly out of a neutral position in a fore-and-aft direction to lower the grinding arm, being pulled to the right out of a neutral position in a side-to-side direction to swing the grinding arm to the right, and being pulled to the left out of a neutral position in a side-to-side direction to swing the grinding arm to the left.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
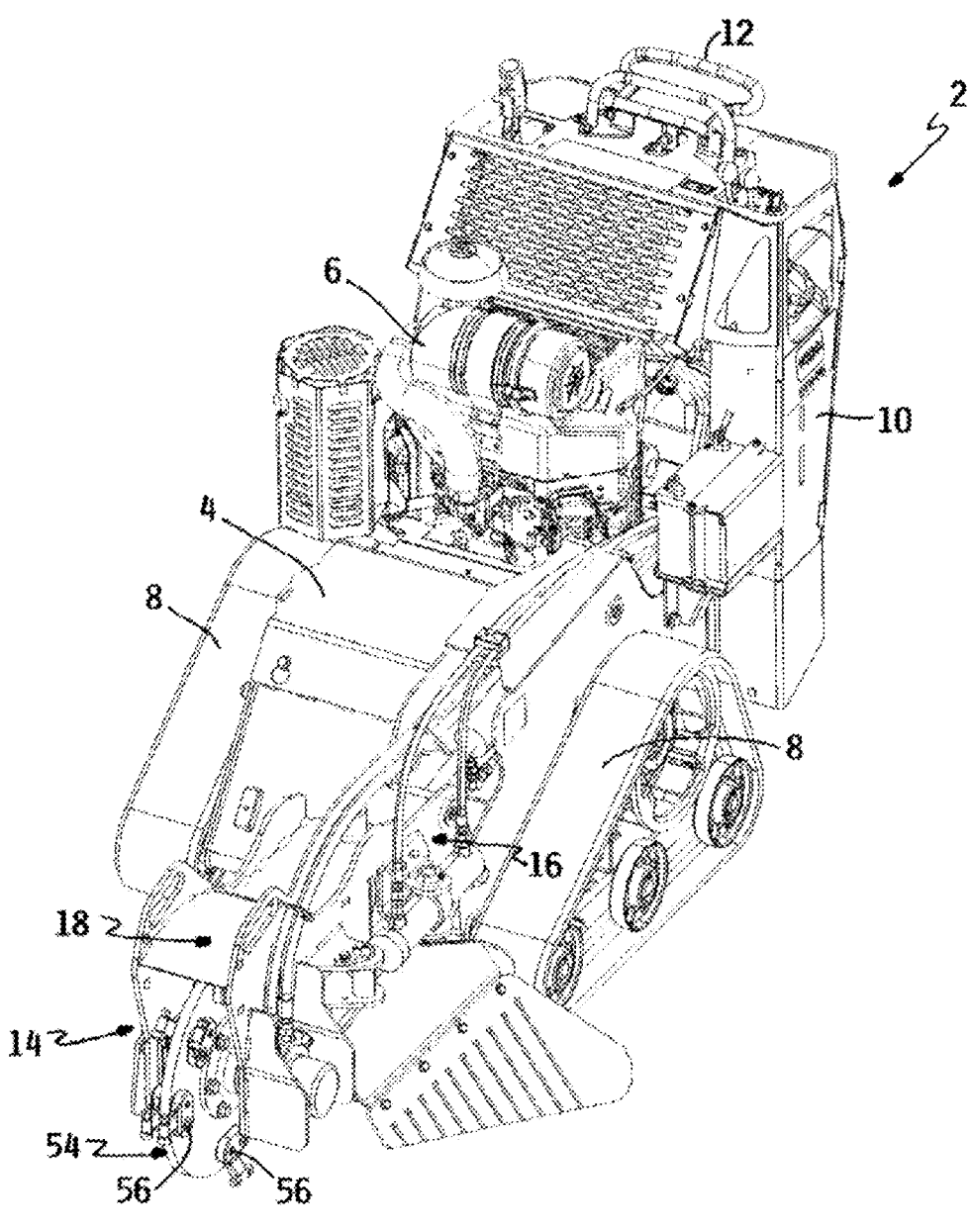
FIG. 1 is a perspective view of a stump grinder according to this invention.

Referring first to FIG. 1, one embodiment of a stump grinder according to this invention is generally illustrated as 2. Stump grinder 2 comprises a traction frame 4 that carries a power source 6, such as an internal combustion engine, that provides the power for propelling frame 4 over the ground. The propulsion means can take different forms, but in the illustrative embodiment shown in FIG. 1 comprises a pair of elongated, ground engaging tracks 8. A single such track 8 is located adjacent and immediately outboard of each of the opposite left and right sides of frame 4.

Frame 4 has an upwardly extending portion 10 at the rear thereof behind which an operator may walk on the ground as frame 4 is propelled over the ground. The top of rear portion 10 of frame 4 carries various controls that may be comfortably gripped by the operator as the operator stands behind frame 4. Among these controls is a traction and steering control indicated generally as 12. When power source 6 is in operation, the operator may manipulate traction and steering control 12 to cause a drive system (not shown) carried on frame 4 to drive ground engaging tracks 8 in forward or reverse at desired speeds with steering being accomplished through driving tracks 8 differentially at different speeds. The tracked frame 4 illustrated herein as well as the traction and steering control 12 are of the type shown in U.S. Pat. Nos. 6,460,640 and 6,709,223, which are assigned to the assignee of this invention and which are hereby incorporated by reference.

A grinding arm 14 is mounted on the front of frame 4 in a laterally offset position in which grinding arm 14 extends forwardly along the left side of frame 4 with grinding arm 14 overlying the left side of frame 4. Grinding arm 14 comprises two sections thereof, namely a rear section 16 and a front section 18. Rear section 16 of grinding arm 14 pivots on frame 4 about a lateral, substantially horizontal pivot axis x such that the entire grinding arm 14, i.e. both the rear and front sections 16 and 18 thereof, can swing or pitch downwardly or upwardly towards or away from the ground as indicated by the arrows A and B in FIG. 3. Pivot axis x is located very low on frame 4 at a distance that is only a few inches above the rotational axis of the front drive pulley or sprocket on track 8. Front section 18 of grinding arm 14 pivots relative to rear section 16 about a substantially vertical pivot axis y to swing or pivot front section 18 from side-to-side as indicated by the arrows C and D in FIGS. 2 and 3.

Figure 3:
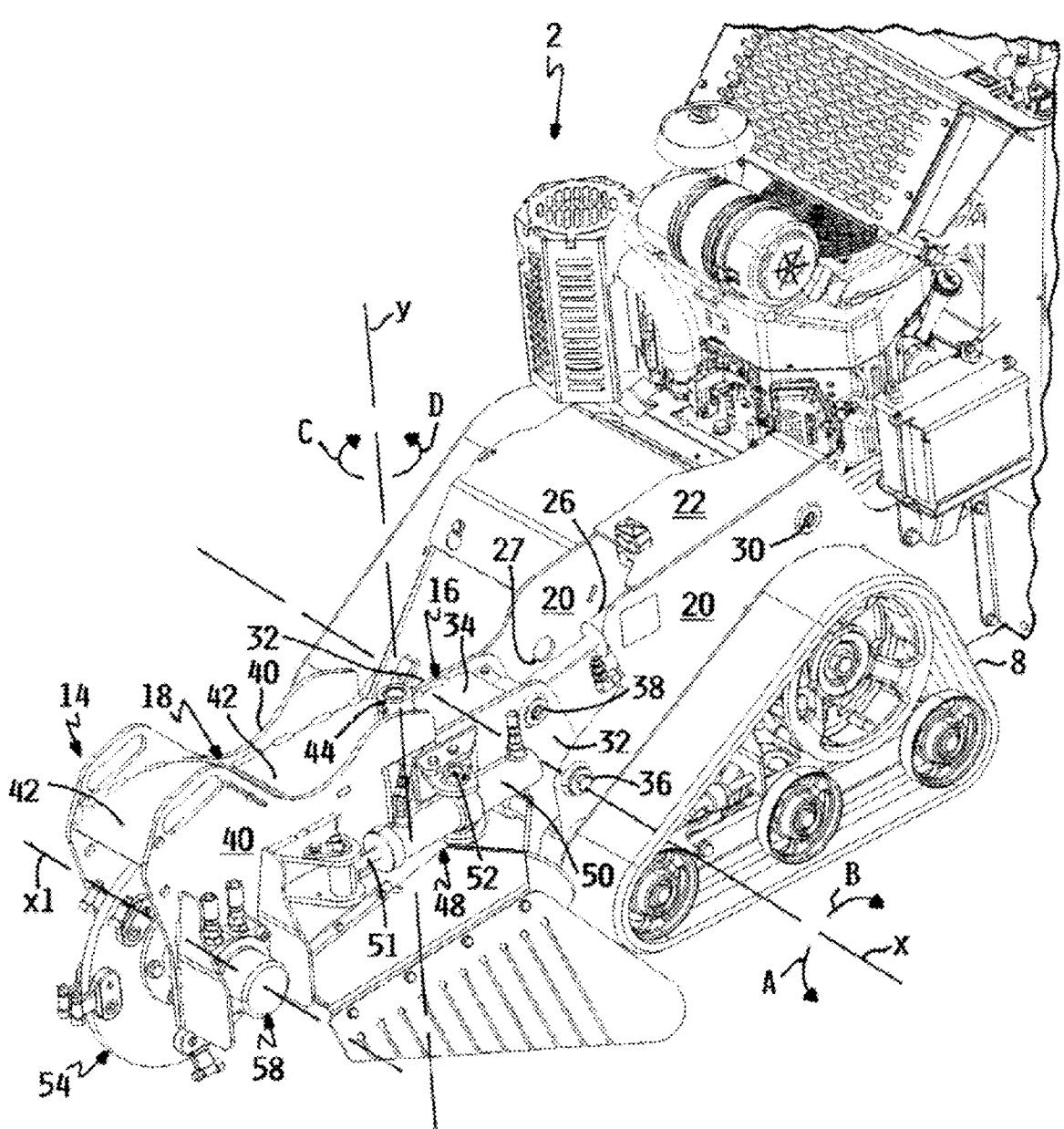
FIG. 3 is a partial perspective view of the stump grinder of FIG. 1, particularly illustrating the left side of the forwardly extending grinding arm.
Figure 4:
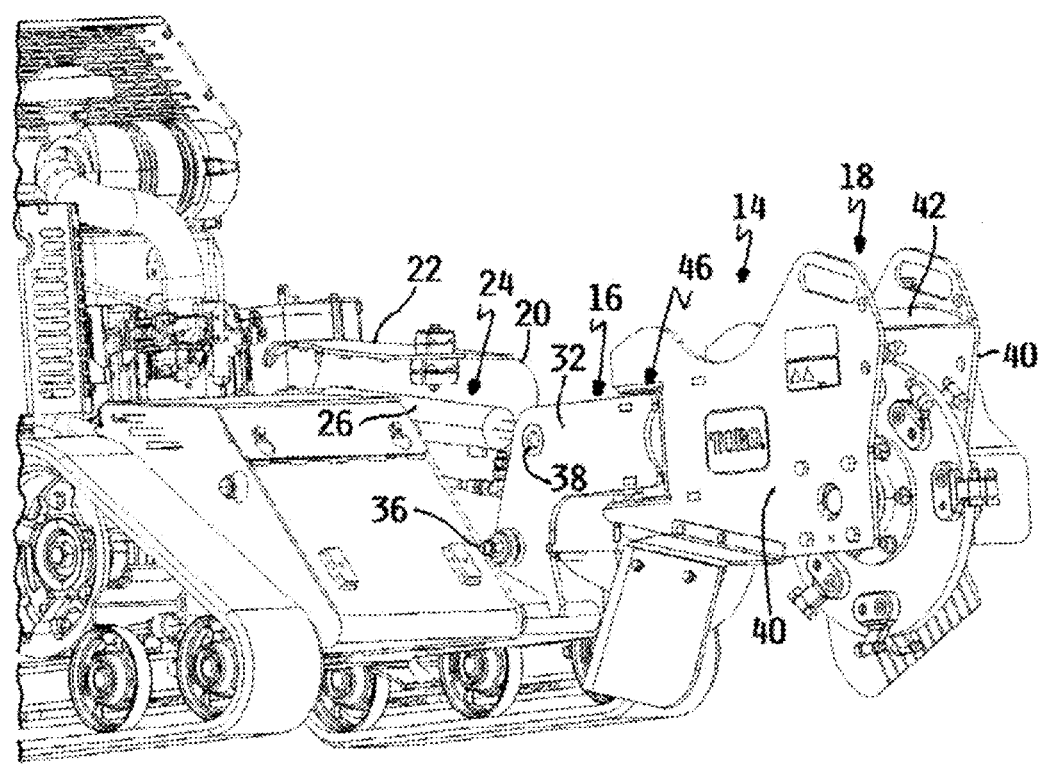
FIG. 4 is a perspective view similar to FIG. 3, but illustrating the right side of the forwardly extending grinding arm.

Referring to FIGS. 3 and 4, frame 4 includes a pair of laterally spaced, forwardly extending support walls 20 having at least lower portions thereof that extend forwardly to a front end of frame 4. A top wall 22 joins and connects support walls 20 together over rear portions of support walls 20. Note that in FIG. 4 the inner support wall 20 has been removed to illustrate a first hydraulic actuator 24 that is located between support walls 20 and beneath top wall 22. The cylinder 26 of first hydraulic actuator 24 is pivotally connected to the rear of support walls 20 by a pivot pin 30.

Rear section 16 of grinding arm 14 also includes a pair of side walls 32 that are joined or connected together by a top wall 34. Side walls 32 of rear section 16 have a slightly narrower spacing than the spacing of support walls 20 of frame 4 such that rear ends of side walls 32 of rear section 16 nest between support walls 20 of frame 4. Side walls 32 of rear section 16 are generally L-shaped with one leg of the L-shape extending downwardly to pivotally journal rear section 16 of grinding arm 14, and thus the entire grinding arm 14, on a pivot pin 36 that is carried between support walls 20 and that forms the horizontal pivot axis x for grinding arm 14. The rod 27 of first hydraulic actuator 24 pivotally connects to the rear ends of side walls 32 of rear section 16 at a pivot pin 38 close to the juncture of the legs of the L-shape and above the pivot pin 36 forming the pivot axis x. Thus, retraction of rod 27 into cylinder 26 of first hydraulic actuator 24 causes upward pivoting of grinding arm 14 in the direction of arrow B and extension of rod 27 out of cylinder 26 causes downward pivoting of grinding arm 14 in the direction of arrow A.

Front section 18 of grinding arm 14 is generally similar in structure to that of rear section 16 in the sense that front section 18 also comprises a pair of laterally spaced side walls 40 that are joined or connected together by a top wall 42. Side walls 40 of front section 18 are laterally spaced apart by a greater distance than side walls 32 of rear section 16 to allow the rear of front section 18 to telescopically nest over and around the front of rear section 16. A vertical pivot structure 44 forming the vertical pivot axis y pivotally joins the front and rear sections 18 and 16 together with side walls 40 of front section 18 having U-shaped cutouts 46 to allow front section 18 to swing or pivot around the front of rear section 16 without interference between the two.

As shown in FIG. 3, a second hydraulic actuator 48 has a cylinder 50 that is pivotally mounted by a pivot pin 52 to the exterior of one of side walls 32 of rear section 16. Rod 51 of second hydraulic actuator 48 is pivotally connected to an exterior of one of side walls 40 of front section 18 of grinding arm 14. Extension and retraction of rod 51 of second hydraulic actuator 48 causes front section 18 of grinding arm 14 to swing or pivot about the vertical pivot axis y relative to rear section 16 of grinding arm 14.

FIGS. 1-4 illustrate grinding arm 14 in a home position in which grinding arm 14 is substantially horizontal and with grinding arm 14 being longitudinally aligned with rear section 16 of grinding arm 14 with grinding arm 14 extending straight ahead in a longitudinal fore-and-aft direction. From this home position, grinding arm 14 can pivot or pitch downwardly in the direction of arrow A in FIG. 3 approximately 28° and can pivot or pitch upwardly in the direction of arrow B in FIG. 3 approximately 52°, for a total of approximately 80° of swing about the horizontal pivot axis x. From this home position, front section 18 of grinding arm 14 can pivot to the left in the direction of arrow C in FIG. 3 approximately 80° and can pivot to the right in the direction of arrow D in FIG. 3 approximately 20°, for a total of approximately 100° of swing about the vertical pivot axis y. Clearly, front section 18 of grinding arm 14 has an asymmetric swing angle in which it swings approximately four times further to the right than it does to the left (i.e. 80° to the right versus 20° to the left).

Front section 18 of grinding arm 14 has a front end that houses a rotatable grinding wheel 54. Grinding wheel 54 is in the form of a substantially flat, planar disc that has a plurality of stump or wood grinding tools 56 attached to the periphery thereof at circumferentially spaced locations. The nature of the wood grinding tools 56 that are used is not important to this invention and may be of any type that is known in the stump grinder art. Grinding wheel 54 is rotatably journalled on grinding arm 14 for rotation about a lateral, substantially horizontal, grinding axis x1. See FIG. 3.

Figure 5:
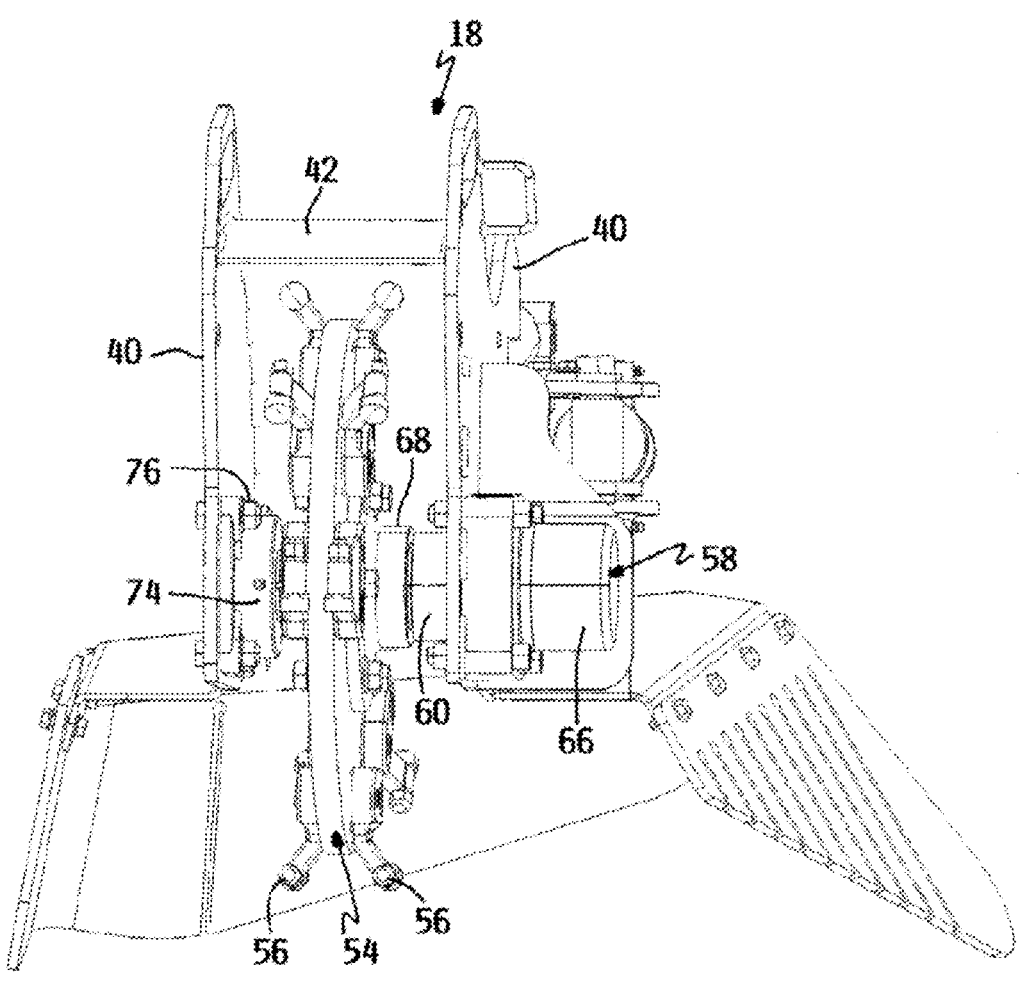
FIG. 5 is a perspective view of the front of the grinding arm of the stump grinder of FIG. 1, particularly illustrating the third bearing and drive motor that support the grinding wheel from opposite sides thereof.
Figure 6:
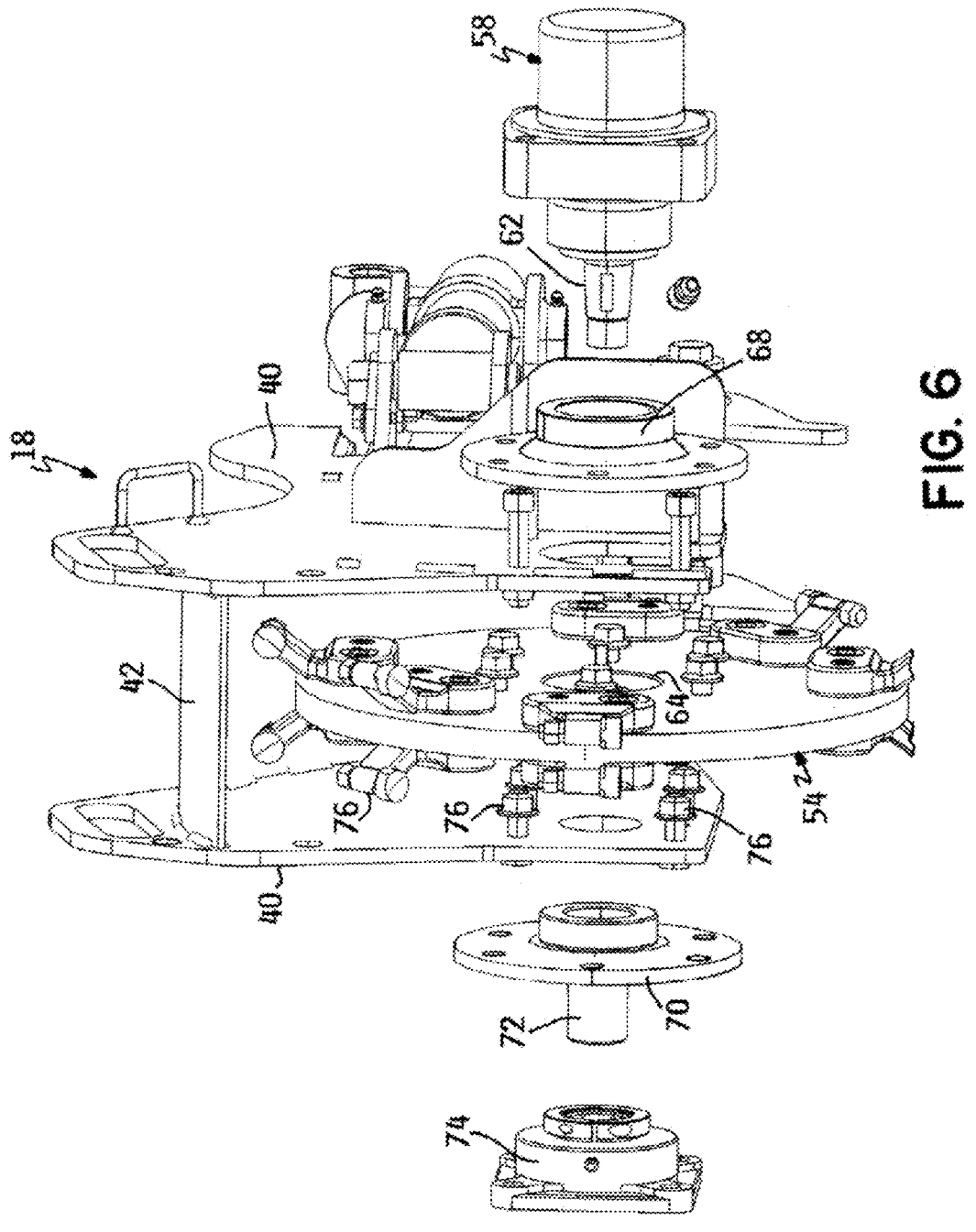
FIG. 6 is a perspective view similar to FIG. 5, but with the third bearing, stub shaft support hub, drive hub and drive motor for the grinding wheel being shown in exploded form for the sake of clarity.

As shown in FIGS. 5 and 6, grinding wheel 54 is mounted to front section 18 of grinding arm 14 and is powered by a hydraulic motor 58 in a simple and durable manner. Motor 58 is bolted to an exterior of one of side walls 40 of front section 18. Motor 58 has an inner portion 60 extending through side wall 40 to be positioned relatively close to one side face of grinding wheel 54. Motor 58 has an inwardly projecting drive shaft 62 that sticks further inwardly from the inner portion of motor 58 such that drive shaft 62 extends into, but not through, a central bore 64 in grinding wheel 54. FIG. 6 depicts central bore 64. Motor 58 includes a pair of radial bearings (not shown) within the housing thereof that rotatably journal and support drive shaft 62 of motor 58 against radial loads on drive shaft 62. Motor 58 is preferably a TJ Series Motor manufactured by the Hydraulic Pump/ Motor Division of Parker Hannifin Corporation.

One face of grinding wheel 54 has a drive hub 68 bolted thereto. The interior of drive hub 68 has a keyed, splined, or tapered drive connection (not shown) to drive shaft 62 of motor 58. Thus, as motor 58 is rotated by hydraulic fluid flow therethrough, the rotation of drive shaft 62 will be transferred through drive hub 58 to grinding wheel 54 to rotate the same about its axis of rotation x1. The support of grinding wheel 54 could end there, as is conventional in the stump grinder art, with grinding wheel 54 simply being supported by motor 58 alone. However, the Applicants have found that this imposes undesirably high loads on motor 58 in many stump and wood grinding operations.

Thus, grinding wheel 54 of this invention is further supported on the other side or face thereof as well. A support hub 70 that carries an outwardly extending stub shaft 72 is bolted to the opposite side face of grinding wheel 54. See FIG. 7. A third radial bearing 74, namely a stub shaft bearing, is then bolted to the inside of the opposite side wall 40 of front section 18 of grinding arm 14. Third bearing 74 rotatably journals and supports stub shaft 72 to support the opposite side of grinding wheel 54. Thus, going from right to left in FIG. 5, there are three radial bearings that carry the radial loads from grinding wheel 54, i.e. a first drive shaft radial bearing inside motor 58, a second drive shaft radial bearing inside motor 58 with both drive shaft bearings being on one side of grinding wheel 54, and a third stub shaft radial bearing 74 on the opposite side of grinding wheel 54. This allows a hydraulic motor 58 to be simply and inexpensively bolted to one side wall 40 of front section 18 of grinding arm 14 but, with the use of stub shaft bearing 74, still provides radial bearing support on both sides of grinding wheel 54. Enough vertical slop or play is desirably provided between the bolts 76 and the holes that are used to bolt stub shaft bearing 74 in place such that the vertical position of stub shaft bearing 74 on side wall 40 can be shifted up and down as need be before stub shaft bearing 74 is firmly tightened into place to allow alignment of stub shaft 72 with drive shaft 62.

Figure 2:
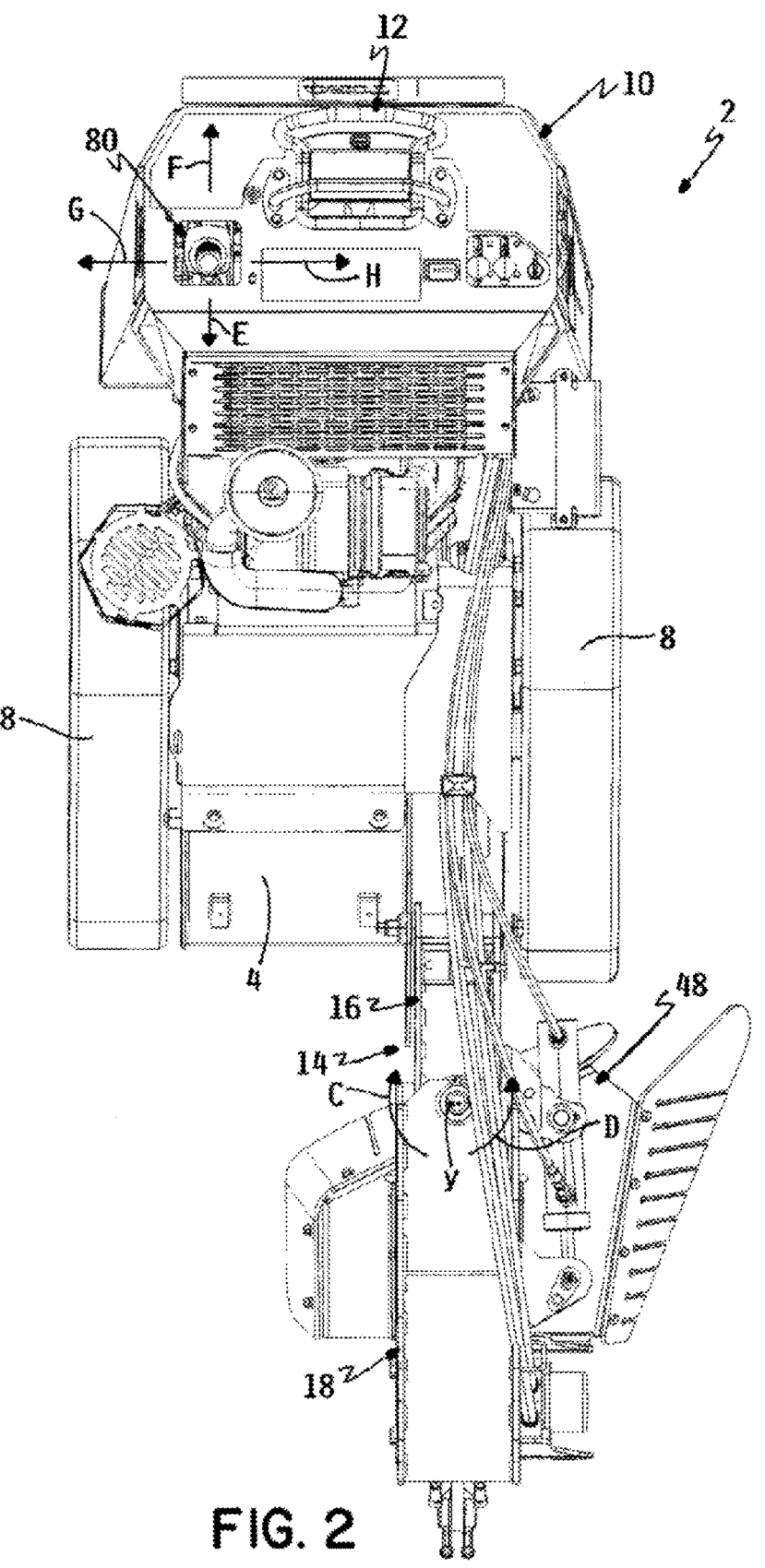
FIG. 2 is a top plan view of the stump grinder of FIG. 1.
Figure 7:
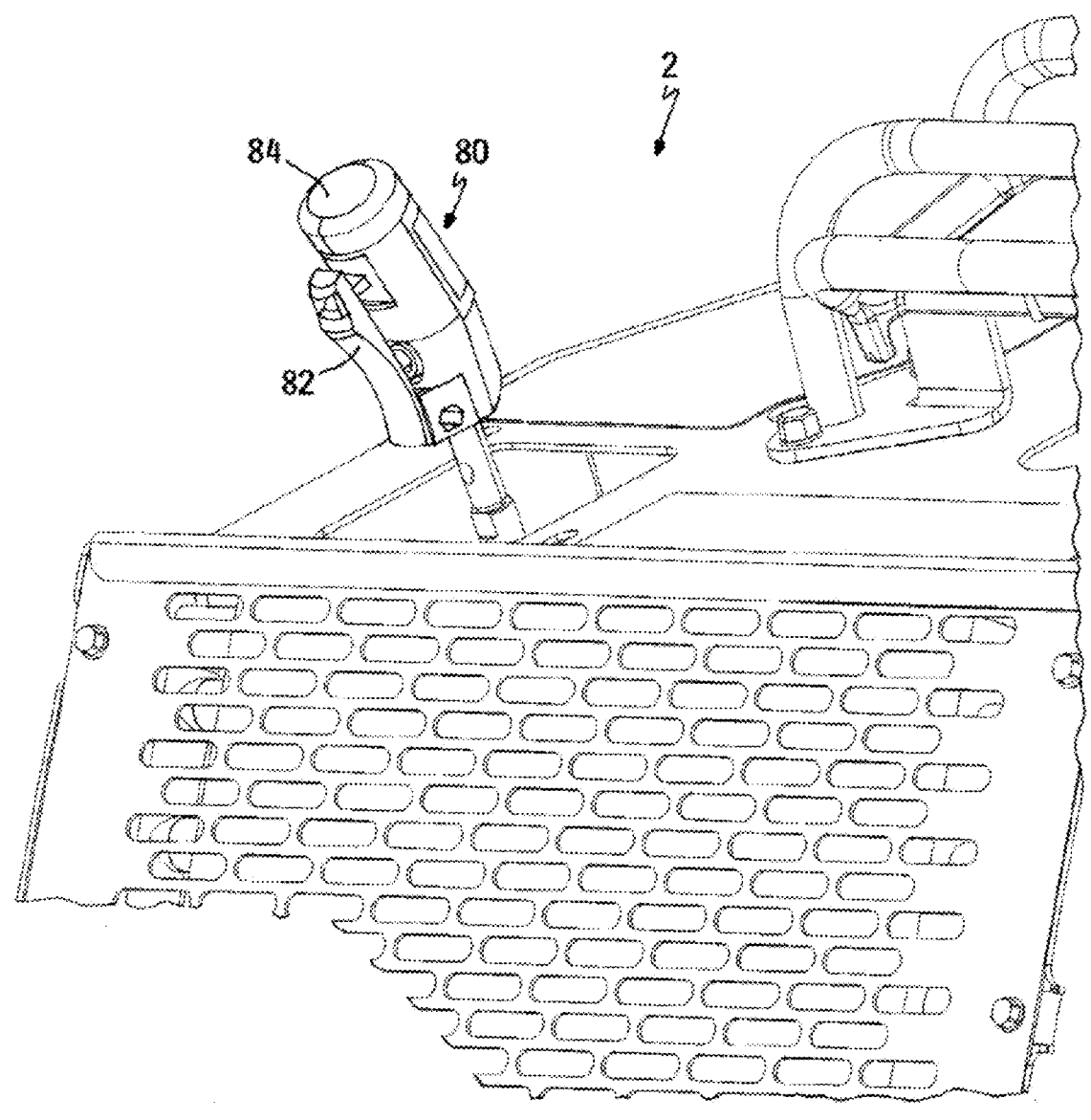
FIG. 7 is a partial perspective view of the stump grinder of FIG. 1, particularly illustrating the single joystick control for operating the grinding arm and the grinding wheel.

Referring now to FIGS. 2 and 7, stump grinder 2 of this invention includes a joystick 80 for simple and intuitive operation of grinding arm 14 and grinding wheel 54. Joystick 80 has a centered neutral position as is typical of joysticks, which neutral joystick position corresponds to the home position of grinding arm 14. Joystick 80 is pivotally mounted in any suitable manner in frame 4 for movement in a longitudinal fore-and-aft direction as indicated by the arrows E and F in FIG. 2. This longitudinal motion of joystick 80 will control first hydraulic actuator 24 to cause grinding arm 14 to pivot up in the direction of the arrow B when joystick 80 is pulled back in the direction of arrow F and to cause grinding arm 14 to pivot down in the direction of the arrow A when joystick 80 is pushed forwardly in the direction of arrow E. The pivotal mounting of joystick 80 also permits movement of joystick 80 in a lateral side-to-side direction as indicated by the arrows G and H in FIG. 2. This lateral motion of joystick 80 will control second hydraulic actuator 48 to cause front section 18 of grinding arm 14 to swing from side-to-side in a direction corresponding to the direction of joystick 80, front section 18 swinging in the direction of the arrow C when joystick 80 swings in the direction of the arrow G and in the direction of the arrow D when joystick 80 swings in the direction of the arrow H.

Thus, the user need only operate a single control, namely joystick 80, and need move that control only in a direction corresponding to the up and down and side-to-side pivoting that is desired for grinding arm 14. This greatly eases the task of operating grinding arm 14, especially for a new or relatively unskilled operator, since the operator need not grip and coordinate the operation of separate control levers. All the operator need use is the single joystick 80.

To further ease the task of operating stump grinder 2, joystick 80 can be provided with a compressible trigger 82 on the front side thereof that controls the on-off operation of grinding wheel 54. In order to start grinding wheel 54, the operator need only press a button 84 on top of joystick 80 and then squeeze trigger 82 rearwardly until the top of trigger 82 abuts against joystick 80. A switch (not shown) will be closed by trigger 82 and grinding wheel 54 will start rotating. Once trigger 82 is closed, the operator can release button 84 on top of joystick 80. To stop grinding wheel 54, the operator need only release trigger 82, which causes trigger 82 to pivot back forwardly away from joystick 80 under the bias of a spring (not shown), to stop the rotation of grinding wheel 54. Integrating the on-off control for grinding wheel 54 on the same joystick 80 that controls the up and down pitching of grinding arm 14 and the side-to-side traverse of grinding wheel 54 further simplifies the task of operating stump grinder 2.

The offset nature of grinding arm 14 provides better visibility to the operator during a stump grinding operation. Of course, during such an operation, the operator will wear eye protection to protect his or her eyes from wood chips or other debris being generated by stump grinder 2. But, grinding wheel 54 can now traverse or swing from the extreme left side of frame 4 in a large arc extending in front of frame 4 and across substantially the entire width of frame 4 without being obstructed by rear section 16 of grinding arm 14, which remains in place on the left side of frame 4 out of the line of vision of the operator. This allows the operator to better see and place grinding wheel 54 at a desired location on the stump or other debris that is being ground down.

Various modifications of this invention will be apparent to those skilled in the art. Thus, the scope of this invention is to be limited only by the appended claims.

We claim:

1. A stump grinder comprising:

(a) a frame that is supported for movement over ground, the frame having a traction drive system for self-propelling the frame over the ground;

(b) a substantially flat, planar and rotatable grinding wheel that rotates in a vertical plane about a substantially horizontal first axis for grinding or comminuting stumps or wood debris, the vertical plane extending through a front and rear end of the frame of the stump grinder;

(c) a grinding arm having a first side wall and an opposite second side wall that are laterally spaced apart from each other, the first side wall being arranged on a first side of the vertical plane and the second side wall being arranged on a second side of the vertical plane, the first side wall and the second side wall forming a space therebetween in which the grinding wheel is rotatably journalled, wherein the grinding arm is carried by the frame and is movable relative to the frame by a first hydraulic actuator and a second hydraulic actuator, the first hydraulic actuator causing the grinding arm to lift and lower relative to the frame, and the second hydraulic actuator causing the grinding arm to move left and right relative to the frame;

(d) a drive hub removably attached to a first side of the grinding wheel, the drive hub having an outer diameter that is substantially smaller than an outer diameter of the grinding wheel, the drive hub located within the space between the first side wall and the second side wall of the grinding arm;

(e) a hydraulic motor connected to one or more hydraulic lines, the hydraulic motor arranged on the first side of the vertical plane and extending laterally outwardly from an exterior surface of the first side wall of the grinding arm, the hydraulic motor having a drive shaft with the drive shaft having a free end that is located outside of a housing of the hydraulic motor within the space between the first side wall and the second side wall of the grinding arm, with the drive shaft having a drive connection to the drive hub such that rotation of the drive shaft of the hydraulic motor rotates the grinding wheel about the substantially horizontal first axis of the grinding wheel;

(f) a stub shaft removably attached to a second side of the grinding wheel with the stub shaft protruding towards the opposite second side wall along the substantially horizontal first axis; and (g) a radial bearing arranged on the second side of the vertical plane and entirely within the space between the first side wall and the second side wall, the radial bearing being configured to receive the stub shaft.

2. The stump grinder of claim 1, further comprising:

a shield extending laterally outwardly from the exterior surface of the first side wall, the shield covering at least a portion of a front side of the hydraulic motor and at least one of the one or more hydraulic lines.

3. The stump grinder of claim 1, further comprising:

a power source for powering the traction drive system and the pivoting of the grinding arm, the power source being mounted on the frame in a stationary position such that the power source does not move with the grinding arm as the grinding arm pivots.

4. The stump grinder of claim 3, wherein the frame has a rear end which carries various hand operated controls for operating the traction drive system and for moving the grinding arm relative to the frame, wherein an upwardly extending portion of the rear end of the frame has a rearwardly facing back end which is substantially unobstructed from behind, wherein the controls are located on the upwardly extending portion of the rear end of the frame sufficiently proximate to the rear end to be configured to permit operation of the controls by a forward facing operator standing substantially directly behind the rear end, and wherein an upper end of the controls extend above the power source.

5. The stump grinder of claim 1, wherein the grinding arm is laterally offset from a vertical central reference plane that extends through a front end and a rear end of the frame.

6. The stump grinder of claim 1, wherein the free end of the drive shaft is sized to be received within the drive hub, and wherein the drive connection is a keyed or splined drive connection to the drive shaft of the hydraulic motor.

7. The stump grinder of claim 1, wherein the drive hub and the stub shaft are each bolted to the grinding wheel by a plurality of bolts, wherein each bolt of the plurality of bolts extends through each of the drive hub, the stub shaft, and the grinding wheel.

8. The stump grinder of claim 1, wherein the radial bearing is bolted to an interior surface of the second side wall.

9. The stump grinder of claim 1, wherein the second hydraulic actuator has a second hydraulic actuator first pivot connection at a first end of the second hydraulic actuator, and wherein the second hydraulic actuator has a second hydraulic actuator second pivot connection, wherein the second hydraulic actuator second pivot connection is located between the first end of the second hydraulic actuator and a second end of the second hydraulic actuator.

10. The stump grinder of claim 9, wherein the first hydraulic actuator is pivotably attached to the stump grinder at a first hydraulic actuator first pivot connection and a first hydraulic actuator second pivot connection, wherein the first hydraulic actuator second pivot connection is located between the first hydraulic actuator first pivot connection and the grinding wheel, and wherein the first hydraulic actuator second pivot connection is located below the first hydraulic actuator first pivot connection when the grinding wheel is at a position in which the substantially horizontal first axis is above a bottom end of a ground engaging track of the traction drive system of the stump grinder.

11. The stump grinder of claim 1, further comprising a pivot pin that enables the grinding arm to lift and lower relative to the frame, wherein the pivot pin is arranged below an upper end of a ground engaging track of the traction drive system of the stump grinder.

12. A grinding arm assembly for a stump grinder, the grinding arm assembly comprising:
   (a) a substantially flat, planar and rotatable grinding wheel that rotates in a vertical plane about a substantially horizontal first axis for grinding or comminuting stumps or wood debris;
   (b) a drive hub bolted to a first side of the grinding wheel, the drive hub having an outer diameter that is substantially smaller than an outer diameter of the grinding wheel;
   (c) a grinding arm having a first side wall and an opposite second side wall that are laterally spaced apart from each other, the first side wall being arranged on a first side of the vertical plane and the second side wall being arranged on a second side of the vertical plane, the first side wall and the second side wall forming a space therebetween in which the grinding wheel is rotatably journalled;
   (d) a hydraulic motor connected to one or more hydraulic lines, the hydraulic motor arranged on the first side of the vertical plane and extending laterally outwardly from an exterior surface of the first side wall of the grinding arm, the hydraulic motor having a drive shaft with the drive shaft having a free end that is located outside of a housing of the hydraulic motor within the space between the first side wall and the second side wall of the grinding arm, with the free end of the drive shaft being sized to be received within the drive hub, the drive shaft having a drive connection to the interior of the drive hub such that rotation of the drive shaft of the hydraulic motor rotates the grinding wheel about the substantially horizontal first axis of the grinding wheel;
   (e) a support hub carrying an outwardly extending stub shaft bolted to a second side of the grinding wheel with the stub shaft protruding towards the second side wall along the substantially horizontal first axis;
   (f) a radial bearing arranged on the second side of the vertical plane and entirely within the space between the first side wall and the second side wall, the radial bearing being configured to receive the stub shaft within a central opening of the radial bearing; and
   (g) a shield extending laterally outwardly from the exterior surface of the first side wall, the shield covering at least a portion of a front side of the hydraulic motor and at least one of the one or more hydraulic lines;
   (h) wherein the drive hub and the support hub are bolted to the grinding wheel by a plurality of bolts, wherein each bolt of the plurality of bolts extends through each of the drive hub, the support hub, and the grinding wheel.

13. The grinding arm assembly of claim 12, further comprising:
   a first pivot pin and a second pivot pin, the first pivot pin and the second pivot pin together enabling vertical movement and lateral movement of the grinding wheel with respect to a frame of a stump grinding vehicle to which the grinding arm assembly is configured to be attached.

14. The grinding arm assembly of claim 13, further comprising:
   a first hydraulic actuator for rotating at least a first portion of the grinding arm assembly about the first pivot pin; and
   a second hydraulic actuator for rotating at least a second portion of the grinding arm assembly about the second pivot pin.

15. The grinding arm assembly of claim 14, wherein the first hydraulic actuator is configured to drive upward movement of at least the first portion of the grinding arm, and wherein the second hydraulic actuator is configured to drive lateral movement of at least the second portion of the grinding arm, wherein the second hydraulic actuator is located on the first side of the vertical plane.

16. The grinding arm assembly of claim 15, wherein the second hydraulic actuator comprises a second hydraulic actuator first pivot connection point and a second hydraulic actuator second pivot connection point.

17. The grinding arm assembly of claim 16, wherein the second hydraulic actuator first pivot connection point is located at a first end of the second hydraulic actuator, and wherein the second hydraulic actuator second pivot connection point is located between the first end and a second end of the second hydraulic actuator.

18. The grinding arm assembly of claim 12, wherein the radial bearing is bolted to the second side wall.

19. The grinding arm assembly of claim 12, wherein the free end of the drive shaft does not extend through a central bore of the grinding wheel.

20. The grinding arm assembly of claim 12, wherein the support hub further comprises a disc portion with a first diameter, the disc portion comprising a plurality of openings extending therethrough, wherein a cylindrical boss extends from a first side of the disc portion and the stub shaft extends from a second side of the disc portion.

21. A stump grinder comprising:
(a) a frame that is supported for movement over ground, the frame having a traction drive system for self-propelling the frame over the ground;
(b) a substantially flat, planar and rotatable grinding wheel that rotates in a vertical plane about a substantially horizontal first axis for grinding or comminuting stumps or wood debris, the vertical plane extending through a front end and a rear end of the frame of the stump grinder;
(c) a grinding arm having a first side wall and an opposite second side wall that are laterally spaced apart from each other, the first side wall being arranged on a first side of the vertical plane and the second side wall being arranged on a second side of the vertical plane, the first side wall and the second side wall forming a space therebetween in which the grinding wheel is rotatably journalled, wherein the grinding arm is carried by the frame and is movable relative to the frame by a first hydraulic actuator and a second hydraulic actuator, the first hydraulic actuator causing the grinding arm to lift and lower relative to the frame, and the second hydraulic actuator causing the grinding arm to move left and right relative to the frame, the second hydraulic actuator having a second hydraulic actuator first pivot connection at a first end of the second hydraulic actuator, and wherein the second hydraulic actuator has a second hydraulic actuator second pivot connection, wherein the second hydraulic actuator second pivot connection is located between the first end of the second hydraulic actuator and a second end of the second hydraulic actuator;
(d) a drive hub located on a first side of the grinding wheel;
(e) a hydraulic motor arranged on the first side of the vertical plane and extending laterally outwardly from an exterior surface of the first side wall of the grinding arm, the hydraulic motor having a drive shaft with the drive shaft having a free end that is located outside of a housing of the hydraulic motor within the space between the first side wall and the second side wall of the grinding arm, with the drive shaft having a drive connection to the drive hub such that rotation of the drive shaft of the hydraulic motor rotates the grinding wheel about the substantially horizontal first axis of the grinding wheel;
(f) a stub shaft attached to a second side of the grinding wheel with the stub shaft protruding towards the opposite second side wall along the substantially horizontal first axis;
(g) a radial bearing arranged on the second side of the vertical plane within the space between the first side wall and the second side wall, the radial bearing being configured to support the stub shaft; and
(h) a control console for controlling the movement of the grinding arm relative to the frame and steering control of the traction drive system, wherein operating of the grinding wheel and left and right movement of the grinding arm relative to the frame is controlled by a first control of the control console and wherein the steering and drive control of the traction drive system is controlled by a second control that is laterally offset from the first control, wherein the first control further comprises a button and a compressible trigger operably arranged such that pressing the button and then squeezing the compressible trigger causes the grinding wheel to start rotating, releasing the button while continuing to squeeze the compressible trigger allows the grinding wheel to continue rotating, and releasing the compressible trigger causes the grinding wheel to stop rotating.

22. The stump grinder of claim 21, wherein the first control comprises a joystick.

23. The stump grinder of claim 22, wherein the button and the compressible trigger are arranged on the joystick.

24. The stump grinder of claim 21, wherein the first control is further configured to control the lifting and lowering of the grinding arm relative to the frame.

25. The stump grinder of claim 21, wherein the first control comprises a joystick that is further configured to control the lifting and lowering of the grinding arm relative to the frame.

26. The stump grinder of claim 21, wherein the grinding arm is laterally offset from a vertical central reference plane that extends through a front end and a rear end of the frame.

27. A grinding arm assembly for a stump grinder, the grinding arm assembly comprising:
(a) a grinding arm having a first side wall, an opposite second side wall, and a top wall extending between the first and second side walls to define an interior space;
(b) a rotatable grinding wheel partially disposed within the interior space such that a bottommost portion of the grinding wheel extends beyond a bottommost portion of the first and second side walls;
(c) a drive hub mounted to a first side of the grinding wheel, the drive hub including a drive connection;
(d) a support hub mounted to a second side of the grinding wheel, the support hub including a stub shaft;
(e) a plurality of fasteners securing the drive hub and support hub to the rotatable grinding wheel, wherein at least some of the plurality of fasteners extend from the drive hub, through the grinding wheel, and to the support hub;
(f) a radial bearing assembly being located within the interior space and mounted to an interior surface of the first side wall, the radial bearing assembly rotatably supporting and receiving the stub shaft of the support hub; and
(g) a hydraulic motor operably supported by the second side wall and including an output shaft extending into the interior space and in engagement with the drive connection of the drive hub.

28. The grinding arm assembly of claim 27, further comprising:
a shield extending laterally outwardly from an exterior surface of the first side wall, the shield covering at least a portion of a front side of the hydraulic motor and at least one hydraulic line connected to the hydraulic motor.

29. The grinding arm assembly of claim 27, wherein the hydraulic motor is directly mounted to the second side wall.

30. The grinding arm assembly of claim 27, wherein the output shaft of the hydraulic motor is received into an opening of the drive connection of the drive hub, and wherein an interior of the drive hub is keyed or splined to the output shaft.

* * * * *